Patented Dec. 29, 1931

1,838,370

UNITED STATES PATENT OFFICE

REGINALD SCOTT DEAN AND ROGER VERDEN WILSON, OF LA GRANGE, ILLINOIS, ASSIGNORS TO WESTERN ELECTRIC COMPANY, INCORPORATED, OF NEW YORK, N. Y., A CORPORATION OF NEW YORK

SOLDERING FLUX

No Drawing. Application filed November 26, 1926, Serial No. 151,014. Renewed March 27, 1931.

This invention relates to soldering fluxes, and more particularly to a novel method of soldering and to soldering fluxes especially adaptable to practicing the improved method. Experiments have shown that the most efficient soldering fluxes in commercial use are those which evolve an acid gas when heated in the air to the temperature at which ordinary solder is applied to parts in soldering. However, these fluxes tend to deteriorate if left uncovered, because of their reaction with atmospheric moisture. Also, these fluxes frequently react with the moisture in the air after the soldering operation is completed to produce the acid which corrodes the soldered parts, this corrosion continuing until all of the flux remaining on the parts is hydrolyzed. To overcome this tendency it is the usual practice when using the ordinary fluxes to treat a joint after it is soldered with a material which removes or neutralizes the excess flux on the joint so that corrosion will not take place. However, because of their inherent nature or because of their location in an apparatus, many joints cannot be given a subsequent treatment to remove the excess flux, in which cases it is common practice to use rosin as a flux. But experience has proven that the use of rosin as a soldering flux necessitates plating the surfaces to be joined with tin before the soldering operation in order to produce satisfactory joints.

It is the object of this invention to provide a method of soldering and soldering fluxes which will be active only when heated to soldering temperatures.

According to features of the present invention, such fluxes will have efficient fluxing actions upon untinned surfaces, are stable and unreactive at ordinary temperatures and will leave no corrosive materials upon a joint produced with their aid.

It has been found that many halogen and cyanogen derivatives of various carbon compounds are stable and non-corrosive at ordinary temperatures and that these compounds when heated to soldering temperatures evolve gases which are very effective fluxing agents.

Experiments have shown that among the most efficacious of these compounds is naphthalene tetrachloride which is an example of a class of derivatives which evolve halogen acid gases when heated to soldering temperatures. Naphthalene tetrachloride, which is a poly-chlorine derivative of a cyclic hydrocarbon, is stable at ordinary temperatures and is not hydrolyzed by the moisture contained in the atmosphere, but when heated to about 200° C. it evolves dry hydrogen chloride gas. Dry hydrogen chloride gas is very effective in cleaning and preparing the surfaces of parts which are to be soldered, and it has been found that soldered joints made with the aid of naphthalene tetrachloride as a fluxing agent are extremely effective and that no corrosion of the joint takes place subsequent to the soldering operation. In using this material as a soldering flux, it is convenient to form a paste of the material with glycerine, which paste may then be used in soldering operations in a manner similar to that employed with the usual soldering fluxes. Petroleum jelly may also be used with satisfactory results as a carrier for the naphthalene tetrachloride.

Another type of halogen derivatives of carbon compounds which function satisfactorily as soldering fluxes are those which when heated to soldering temperatures evolve free halogens. A representative compound of this type is perchlorpentine, which when heated to about 270° C., decomposes with the evolution of chlorine. The free halogens produced by the decomposition of such compounds are very efficient fluxing agents and very satisfactory results are obtained by their use.

Still another type of carbon compounds which act as fluxing agents are cyanogen derivatives, which when raised to soldering temperatures, evolve hydrogen cyanide gas which has proven to be a very satisfactory fluxing agent. An example of this type of compound is glycollic acid nitrile which decomposes at about 180° C. with the evolution of hydrogen cyanide gas.

In using the above mentioned materials as fluxing agents, the usual steps in soldering parts are employed. In practicing the method of this invention, a quantity of the fluxing material, usually mixed with a "carrier", is first applied to each of the parts to be joined, the parts are placed in the desired relation with respect to each other, and a hot soldering iron is then placed in contact with the adjacent parts so as to heat the fluxing material to a temperature at which it becomes reactive and evolves a fluxing gas which cleans the adjacent surfaces of the parts and prepares them for the application of the solder. A bar or lump of solder is then placed in contact with the hot soldering iron, whereupon a portion of the solder is melted and the desired quantity of molten solder is deposited upon the parts to be joined. When the soldering iron is removed, the solder solidifies and acts as a bond between the several parts.

It is, of course, to be understood that the carbon derivatives mentioned above are merely illustrative of the several types of compounds which act as fluxing agents and that various other halogen and cyanogen derivatives may be used in their stead with satisfactory results. Among the satisfactory substitutes are dichlor anthracene tetrachloride, naphthalene tetrabromine, acrylic acid nitrile and dichlorphenanthrene tetrachloride. Corresponding hydrocarbon compounds containing the other halogens, namely fluorine and iodine and similar cyanogen derivatives which have the properties of evolving fluxing gases at soldering temperatures and which do not react with atmospheric moisture at ordinary temperatures to produce corrodible materials, may be successfully employed in soldering operations.

It is to be understood that the invention is not limited to the exact materials listed herein but may embrace any fluxing materials included within the scope of the appended claims. By the term "fluxing gas" as used in the annexed claims is meant a gas containing either a free halogen, a halogen acid gas, hydrogen cyanide gas, etc., or a mixture of these gases.

What is claimed is:

1. A soldering flux containing a halogen derivative of a carbon compound which is inactive below the range of soldering temperatures.

2. A soldering flux consisting of a carrier and a halogenated hydrocarbon mixed therewith which hydrocarbon is stable at ordinary temperatures and under ordinary atmospheric conditions.

3. A soldering flux having as an ingredient a poly-halogen derivative of a carbon compound.

4. A soldering flux having as an ingredient a halogenated hydrocarbon which is stable and non-corrosive at ordinary temperatures.

5. A soldering flux having as an ingredient a halogenated hydrocarbon which is stable at ordinary temperatures and under ordinary atmospheric conditions and which evolves a fluxing gas at soldering temperatures.

6. A soldering flux having as an ingredient a halogen derivative of a carbon compound which is stable and non-corrosive at ordinary temperatures and which evolves a halogen containing gas at soldering temperatures.

7. A soldering flux containing a chlorinated hydrocarbon which is stable at ordinary temperatures and which evolves hydrogen chloride at soldering temperatures.

8. A soldering flux having as an ingredient a poly-chlorine derivative of a carbon compound which is stable at ordinary temperatures.

9. A soldering flux containing a chlorinated cyclic hydrocarbon which is stable and non-corrosive at ordinary temperatures and which evolves hydrogen chloride at soldering temperatures.

10. A flux for use with solder consisting of a carrier and a chlorinated cyclic hydrocarbon mixed therewith.

11. A soldering flux containing a poly-halogen derivative of naphthalene.

12. A soldering flux comprising a carrier and a poly-chlorine derivative of naphthalene mixed therewith.

13. A soldering flux containing naphthalene tetrachloride.

14. A soldering flux comprising naphthalene tetrachloride mixed with glycerine as a carrier.

15. A soldering flux containing a halogenated cyclic hydrocarbon which is stable and non-corrosive at ordinary temperatures and which evolves a halogen containing gas at soldering temperatures.

16. A soldering flux having as an ingredient a material selected from the group consisting of naphthalene tetrachloride, perchlorpentine, and glycollic acid nitrile.

17. A soldering flux having as an ingredient a halogen compound of a hydrocarbon, which compound is stable at ordinary temperatures and evolves a fluxing gas upon heating.

18. A soldering flux having as an ingredient a halogen compound of a hydrocarbon, which compound evolves hydrogen chloride upon heating.

In witness whereof, we hereunto subscribe our names this 6th day of November, A. D. 1926.

REGINALD SCOTT DEAN.
ROGER VERDEN WILSON.